US007054096B1

(12) United States Patent  
Sun et al.

(10) Patent No.: US 7,054,096 B1  
(45) Date of Patent: May 30, 2006

(54) METHOD AND APPARATUS FOR DETERMINING EMBEDDED RUNOUT CORRECTION VALUES

(75) Inventors: Yu Sun, Fremont, CA (US); Lin Guo, Milpitas, CA (US); Don Brunnett, Pleasanton, CA (US)

(73) Assignee: Maxtor Corporation, Longmont, CO (US)

( * ) Notice: Subject to any disclaimer, the term of this patent is extended or adjusted under 35 U.S.C. 154(b) by 3 days.

(21) Appl. No.: 10/338,047

(22) Filed: Jan. 6, 2003

Related U.S. Application Data

(60) Provisional application No. 60/345,442, filed on Jan. 4, 2002.

(51) Int. Cl.  
*G11B 5/596* (2006.01)

(52) U.S. Cl. .................................................. 360/77.04
(58) Field of Classification Search ............. 360/77.04, 360/75, 69, 77.07, 77.11, 78.05, 77.02, 31, 360/17; 702/186  
See application file for complete search history.

(56) References Cited

U.S. PATENT DOCUMENTS

| | | | | |
|---|---|---|---|---|
| 4,412,165 A | | 10/1983 | Case et al. ................... 318/636 |
| 5,668,679 A | * | 9/1997 | Swearingen et al. .......... 360/75 |
| 5,875,066 A | * | 2/1999 | Ottesen .................... 360/77.11 |
| 5,920,441 A | * | 7/1999 | Cunningham et al. ... 360/78.05 |
| 5,978,752 A | * | 11/1999 | Morris ........................ 702/186 |
| 5,995,317 A | * | 11/1999 | Ottesen ................... 360/77.04 |
| 6,049,441 A | * | 4/2000 | Ottesen ................... 360/77.04 |
| 6,069,764 A | * | 5/2000 | Morris et al. ............. 360/77.04 |
| 6,101,058 A | * | 8/2000 | Morris ......................... 360/69 |
| 6,115,203 A | | 9/2000 | Ho et al. .................. 360/77.04 |
| 6,141,175 A | * | 10/2000 | Nazarian et al. .......... 360/77.04 |
| 6,310,742 B1 | * | 10/2001 | Nazarian et al. .......... 360/77.04 |
| 6,411,461 B1 | * | 6/2002 | Szita ........................ 360/77.07 |
| 6,411,471 B1 | * | 6/2002 | Liu et al. .................. 360/265.2 |
| 6,437,936 B1 | * | 8/2002 | Chen et al. ............... 360/77.04 |
| 6,449,116 B1 | * | 9/2002 | Morris et al. ............. 360/77.04 |
| 6,522,495 B1 | * | 2/2003 | Lamberts et al. ......... 360/77.04 |
| 6,525,892 B1 | * | 2/2003 | Dunbar et al. ................. 360/31 |
| 6,549,362 B1 | * | 4/2003 | Melrose et al. ........... 360/77.04 |
| 6,563,663 B1 | * | 5/2003 | Bi et al. ................... 360/77.04 |
| 6,606,214 B1 | * | 8/2003 | Liu et al. .................. 360/77.02 |
| 6,674,602 B1 | * | 1/2004 | Miles .......................... 360/75 |
| 6,714,376 B1 | | 3/2004 | Brunnett et al. ............... 360/75 |
| 6,738,205 B1 | * | 5/2004 | Moran et al. .................. 360/17 |
| 6,751,045 B1 | * | 6/2004 | Morris et al. ............. 360/77.04 |
| 6,768,607 B1 | * | 7/2004 | Ottesen et al. ........... 360/77.02 |
| 6,826,006 B1 | * | 11/2004 | Melkote et al. ........... 360/77.04 |
| 6,882,497 B1 | * | 4/2005 | Min et al. ................. 360/77.04 |

\* cited by examiner

*Primary Examiner*—David Hudspeth  
*Assistant Examiner*—Fred F. Tzeng  
(74) *Attorney, Agent, or Firm*—Tejpal S. Hansra

(57) ABSTRACT

A method and apparatus for compensating for non-linearities due to pivot bearing friction when determining embedded runout correction values during partial self-servo write of a disk drive is disclosed. In one embodiment, the disk drive includes a disk surface having a track written thereon and the track has some written-in runout. The written-in runout that is associated with high-frequencies is determined using a first technique. The written-in runout for the track that is associated with low frequencies is determined using a second technique. Results from the two techniques are combined in order to determine embedded runout correction values for the track when partial self-servo writing, in order to reduce error propagation when writing additional tracks.

45 Claims, 5 Drawing Sheets

METHOD AND APPARATUS FOR DETERMINING EMBEDDED RUNOUT CORRECTION VALUES

CROSS-REFERENCE TO RELATED APPLICATIONS

Priority is claimed from U.S. Provisional Patent Application Ser. No. 60/345,442 filed Jan. 4, 2002, which is incorporated herein by reference in its entirety.

FIELD OF THE INVENTION

The present invention relates to computer disk drives. More particularly, the present invention relates method and apparatus for compensating for non-linearities due to pivot bearing friction when determining embedded runout correction values during partial self-servo write of a disk drive.

BACKGROUND OF THE INVENTION

A disk drive is a data storage device that stores digital data in tracks on the surface of a data storage disk. Data is read from or written to a track of the disk using a transducer, which includes a read element and a write element, that is held close to the track while the disk spins about its center at a substantially constant angular velocity. To properly locate the transducer near the desired track during a read or write operation, a closed-loop servo scheme is generally implemented. The servo scheme uses servo data read from the disk surface to align the transducer with the desired track.

Servo data is generally written to the disk using a servo track writer (STW). As is well-known to those skilled in the art, servo data from a prior-written track on the disk surface is not used by the servo track writer in connection with writing servo data for a subsequent track on the disk surface. Instead, the servo track writer uses an external relative encoder to position itself and the disk drive's transducer (through use of one of a variety of push-pin systems) relative to the disk surface in order to write servo data.

There has been a movement towards using the disk drive's transducer to write some portion of the servo data without using the servo track writer's external relative encoder. In such cases, servo data from a prior-written track on the disk surface is used by the disk drive's transducer to write servo data for a subsequent track on the disk surface. U.S. patent application Ser. No. 09/905,564 filed Jul. 13, 2001 (which is incorporated herein by reference) entitled "Partial Servo-Write Fill-In" describes a technique of writing servo data onto one or more disk surfaces. Specifically, a portion of the servo information is written using a servo track writer and a portion of the servo information is self-written by the disk drive's transducer(s). Even more specifically, the servo track writer is used to write gray code, A, B, C and D servo bursts for a first number of tracks, and the servo track writer is used to write gray code, A and B servo bursts for the remaining tracks. The disk drive is then sealed, and the remaining C and D servo bursts are written to the disk using the read and write heads of the disk drive.

A simplified illustration of a partial self-servo writing technique used to write C and D servo bursts is shown in FIG. 1. The bursts in the left-half of FIG. 1 are representative of a group of servo bursts termed 1x servo bursts and the bursts in the right-half of the FIG. 1 are representative of a group of servo bursts termed 2x servo bursts. Along given track, servo information alternates as being grouped with the 1x servo bursts and 2x servo bursts. In other words, consecutive 1x servo bursts are separated by a 2x servo burst and visa-versa (i.e., 1x and 2x servo bursts are immediately adjacent to one another and alternate around the track). As will be explained in more detail below, 2x servo bursts are used to write 1x servo bursts and 1x servo bursts are used to write 2x servo bursts.

As shown in FIG. 1, in step one, a D burst 3 is written by the disk drive's writer (or write head) 1 after the reader (or read head) 2 has been positioned using a complete set of A, B, C and D bursts. That is, the D burst 3 is written in the 1x set of servo bursts after the reader 2 has been positioned using the 2x set of servo bursts. In step two, the D burst 3 is trimmed (as represented by the solid black line identified by reference numeral 4) and a C burst 5 is written in the 1x servo bursts. In writing the C burst 5, the reader is still positioned using the 2x set of servo bursts.

In step three, the reader 2 switches to being positioned by a 1x set of servo bursts and a D burst 6 is written for the 2x set of servo bursts by the disk drive's writer 1 after the reader 2 has been positioned using a complete set of A, B, C and D bursts. The 1x servo bursts used to position the reader 2 would, for example, be located to the right of the set of 2x servo burst shown in FIG. 1 and would be substantially identical to the set of 1x servo bursts shown in FIG. 1. In step four, the D burst 6 is trimmed and a C burst 7 is written. The reader 2 is positioned using the 1x set of servo bursts prior to writing C burst 7. The process repeats until C and D bursts have been filled-in from approximately the outer diameter OD to approximately the inner diameter (ID) of the disk surface.

In an ideal disk drive system, the tracks of the data storage disk are written as non-perturbed circles situated about the center of the disk. As such, each of these ideal tracks includes a track centerline that is located at a known constant radius from the disk center. In an actual system, however, it is difficult to write non-perturbed circular tracks to the data storage disk. That is, due to certain problems (e.g., vibration, bearing defects, etc.), tracks are generally written differently from the ideal non-perturbed circular track shape. Positioning errors created by the perturbed nature of the tracks are known as written-in repetitive runout (W_RRO or WRO), and also have been known as STW_RRO since tracks have been traditionally written by a servo track writer (STW).

The writing of non-perturbed circular tracks is especially problematic when partial self-servo writing. That is, when servo data from a prior-written track on the disk surface is used by the disk drive's transducer to write servo data for a subsequent track on the disk surface, the WRO may be compounded from track-to-track.

In order to reduce problems associated with WRO, disk drive manufacturers have developed techniques to determine the WRO, so that compensation values (also known as embedded runout correction values or ERC values) may be generated and used to position the transducer along an ideal track centerline. Examples of techniques used to determine ERC values may be found in U.S. Pat. No. 4,412,165 to Case et al. entitled "Sampled Servo Position Control System," U.S. Pat. No. 6,115,203 to Ho et al. entitled "Efficient Drive-Level Estimation of Written-In Servo Position Error," and U.S. patent application Ser. No. 09/753,969 filed Jan. 2, 2001 entitled "Method and Apparatus for the Enhancement of Embedded Runout Correction in a Disk Drive," all of which are incorporated herein by reference.

It has been determined that WRO is related to a position error signal due to repeatable runout (PES_RRO) by a predetermined transfer function S(z) 200, as illustrated in FIG. 2. The transfer function 200, in general, describes how the servo control system reacts to and follows the perturbed track. That is, WRO is the stimulus and PES_RRO is the response. As illustrated in FIG. 3, in order to determine WRO values using PES_RRO values, the inverse transfer function $S^{-1}(z)$ 300 must be determined and the PES_RRO values must be convolved therewith.

The inverse transfer function $S^{-1}(z)$ 300 may be determined using a variety of techniques, such as those described in U.S. Pat. No. 6,115,203 to Ho et al. entitled "Efficient Drive-Level Estimation of Written-In Servo Position Error," and U.S. patent application Ser. No. 09/753,969 filed Jan. 2, 2001 entitled "Method and Apparatus for the Enhancement of Embedded Runout Correction in a Disk Drive."

PES_RRO values may be determined by taking position error signal measurements while track following and averaging the position error for each servo sector associated with the track for multiple revolutions of the disk (e.g., 8 revolutions). As will be understood by those skilled in the art, the position error is averaged for multiple revolutions of the disk, so that the affects of non-repeatable runout may be averaged out.

The result of the convolution operation is the WRO (see FIG. 3). The WRO values associated with each servo sector may then be used to determine compensation values (or embedded runout correction values) for each servo sector of the track. The embedded runout correction values are then written to an embedded runout correction field included as part of the data stored in each of the servo sectors.

During normal operation of the disk drive, the transducer reads the ERC value stored in each servo sector of a desired track. The ERC value is then used to modify the position error signal associated with a servo sector to cancel the offset between the non-ideal track (i.e., the track that was written onto the disk surface) and an ideal track, so that the transducer (approximately) follows the ideal track. For example, the ERC value for a sector may be subtracted from a position error signal value read by the transducer for the sector to obtain a modified position error signal value. The modified position error signal value may then be applied in generating a control signal for operating a voice coil motor to position the transducer.

In the case of partial self-servo writing, it is especially important that ideal circular tracks are followed. If ideal tracks are not followed, the perturbations from the non-ideal tracks will be compounded as the disk drive's transducer writes C and D bursts on additional tracks. Accordingly, when partial self-servo writing, embedded runout correction values for a track should be determined, so that a transducer can follow (or approximately follow) the path of an ideal track when writing a subsequent track.

One of the prerequisites to being able to determine embedded runout correction values is the accuracy of approximating the inverse transfer function of the system. That is, if the inverse transfer function is not properly approximated (or modeled) the resultant ERC values will not be properly calculated.

The inventors of the present invention have observed that the inverse transfer function of the disk drive is susceptible to modeling imperfections at low frequencies due to non-linearities introduced by pivot bearing friction associated with pivoting the actuator arm relative to the disk surface. This is especially true in the case of disk drives employing a small number of heads (e.g., 1 or 2 heads), since the inertia is smaller than for disk drives employing a relatively large number of heads (e.g., 4 or more heads). Accordingly, without compensating for these non-linearities, embedded runout correction values may not be properly calculated and may lead to error propagation when writing C and D bursts on subsequent tracks.

Therefore, it would be desirable to a method and apparatus for compensating for non-linearities due to pivot bearing friction when calculating embedded runout correction values for a partial self-servo writing system in a disk drive.

SUMMARY OF THE INVENTION

The present invention is designed to meet the aforementioned, and other, needs. The invention is directed to a method and apparatus for compensating for non-linearities due to pivot bearing friction when calculating embedded runout correction values for a partial self-servo writing system in a disk drive.

In one embodiment, the disk drive includes a disk surface having a track written thereon and the track has some written-in runout. The written-in runout that is associated with high-frequencies is determined using a first technique. The written-in runout for the track that is associated with low frequencies is determined using a second technique. Results from the two techniques are combined in order to determine embedded runout correction values for the track when partial self-servo writing, in order to reduce error propagation when writing additional tracks.

Other embodiments, objects, features and advantages of the invention will be apparent from the following specification taken in conjunction with the following drawings.

DETAILED DESCRIPTION OF THE PREFERRED EMBODIMENT

Figure 1:
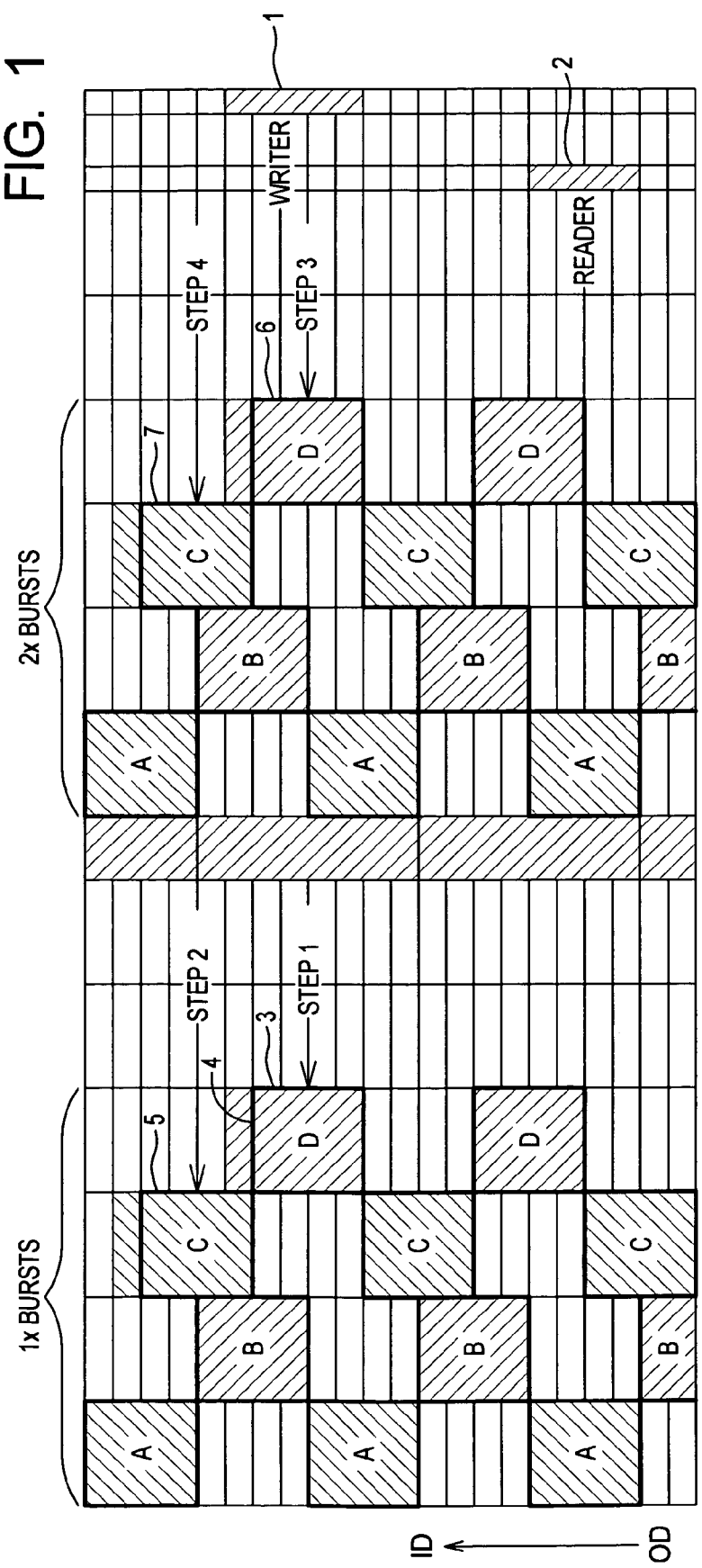
FIG. 1 is a simplified illustration of a partial self-servo writing technique used to write C and D servo bursts.
Figure 2:
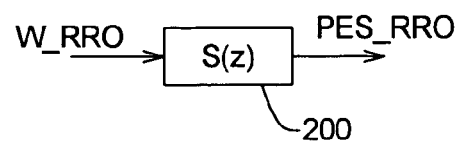
FIG. 2 is a block diagram that depicts the relationship between written-in repetitive runout and position error signal for a particular track.
Figure 3:
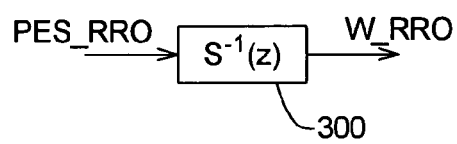
FIG. 3 is a block diagram that depicts the relationship between the position error signal for a particular track and the written-in repetitive runout.

While this invention is susceptible of embodiments in many different forms, there are shown in the drawings and will herein be described in detail, preferred embodiments of the invention with the understanding that the present disclosure is to be considered as an exemplification of the principles of the invention and is not intended to limit the broad aspects of the invention to the embodiments illustrated.

The present invention is directed to method and apparatus for compensating for non-linearities due to pivot bearing friction when determining embedded runout correction values for a partial self-servo writing system for a disk drive. Specifically, written-in runout is determined for low frequencies (e.g., at frequencies where there are non-linearities due to pivot bearing friction) in a first manner and written-in runout is determined for high frequencies in a second manner. After combining the low-frequency written-in runout and high-frequency written-in runout, embedded runout correction values may be calculated for a track and used in writing additional tracks.

Figure 4:
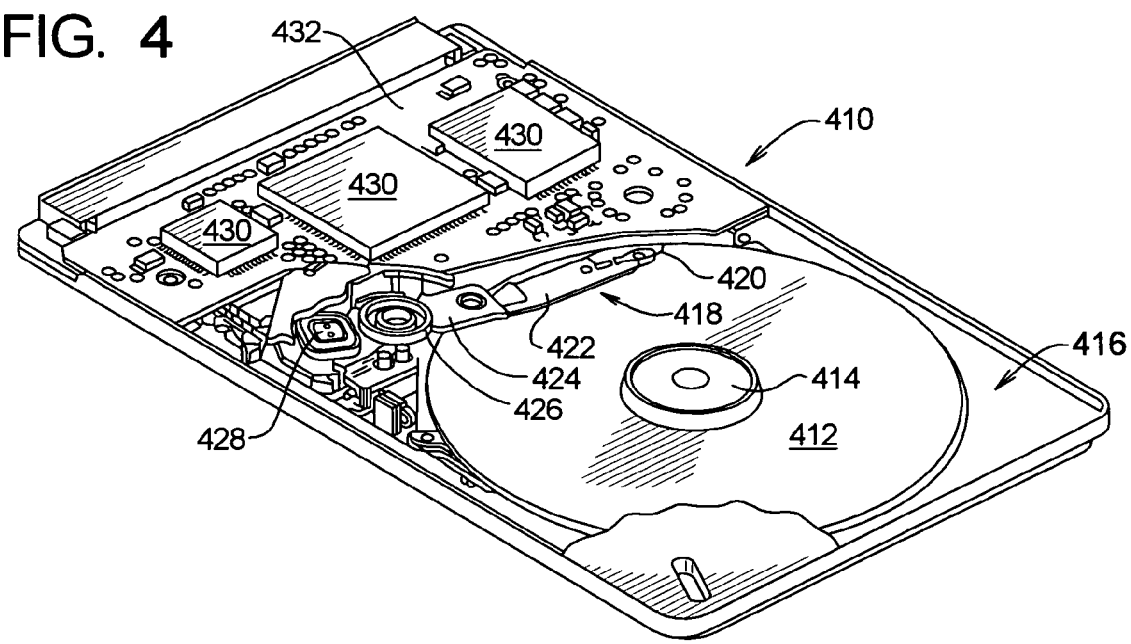
FIG. 4 is a diagrammatic representation illustrating a disk drive with which the present invention may be used.

FIG. 4 illustrates a disk drive, generally designated 410, with which the present invention may be used. The disk drive comprises a disk 412 that is rotated by a spin motor 414. The spin motor 414 is mounted to a base plate 416. An actuator arm assembly 418 is also mounted to the base plate 416.

The actuator arm assembly 418 includes a transducer 420 (having a write head and a read head) mounted to a flexure arm 422 which is attached to an actuator arm 424 that can rotate about a bearing assembly 426. The actuator arm assembly 418 also contains a voice coil motor 428 which moves the transducer 420 relative to the disk 412. The spin motor 414, voice coil motor 428 and transducer 420 are coupled to a number of electronic circuits 430 mounted to a printed circuit board 432. The electronic circuits 430 typically include a read channel chip, a microprocessor-based controller and a random access memory (RAM) device.

The disk drive 410 may include a plurality of disks 412 and, therefore, a plurality of corresponding actuator arm assemblies 418. However, it is also possible for the disk drive 410 to include a single disk 412 as shown in FIG. 4.

Figure 5:
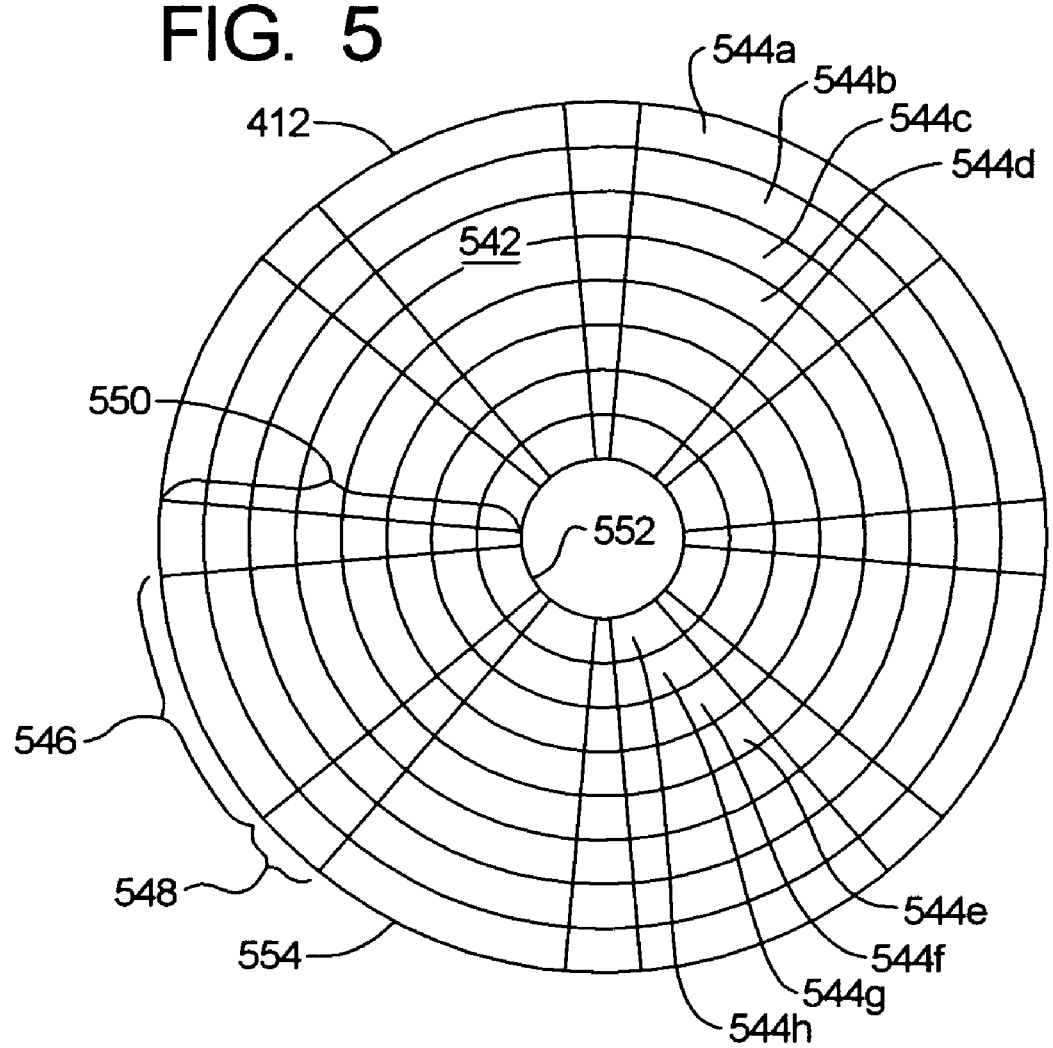
FIG. 5 is a diagrammatic representation of a top view of a magnetic storage disk illustrating a typical organization of data on the surface of the disk.

FIG. 5 is a simplified diagrammatic representation of a top view of a disk 412 having a surface 542 which has been completely formatted to be used in conjunction with a sectored servo system (also known as an embedded servo system). As illustrated in FIG. 5, the disk 412 includes a plurality of concentric tracks 544a-544h for storing data on the disk's surface 542. Although FIG. 5 only shows a relatively small number of tracks (i.e., 8) for ease of illustration, it should be appreciated that typically tens of thousands of tracks are included on the surface 542 of a disk 412.

Each track 544a-544h is divided into a plurality of data sectors 546 and a plurality of servo sectors 548. The servo sectors 548 in each track are radially aligned with servo sectors 548 in the other tracks, thereby forming servo wedges 550 which extend radially across the disk 412 (e.g., from the disk's inner diameter 552 to its outer diameter 554).

Instead of writing all of the radially-aligned servo information which forms servo wedges 550 using a servo track writer, partial self-servo writing techniques have been developed in an effort to format a disk surface, while reducing the amount of time required by the servo track writer. Accordingly, partial self-servo writing techniques are used in an attempt to obtain a disk surface formatted similar to the disk surface 542 shown in FIG. 5.

Figure 6:
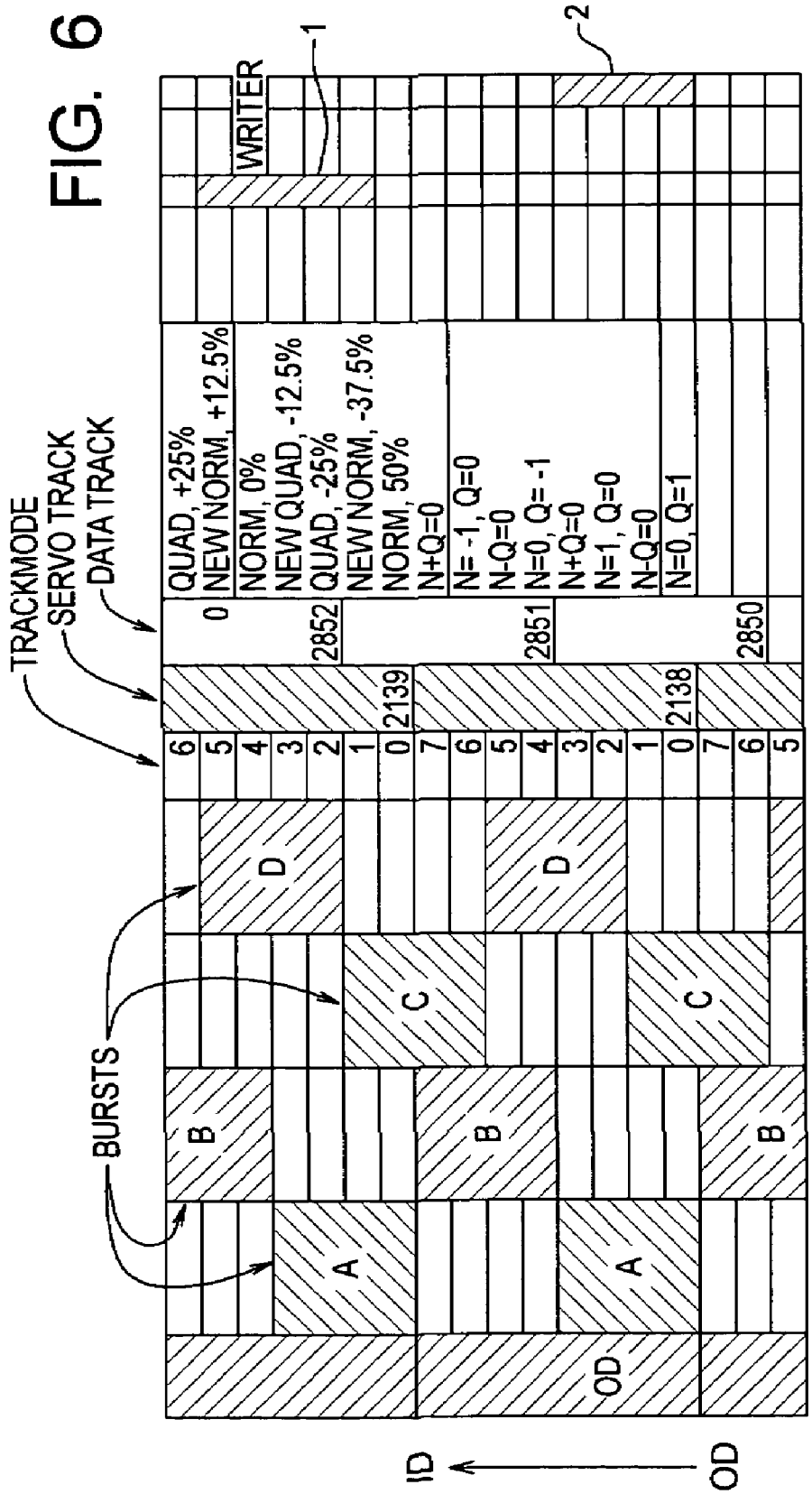
FIG. 6 is a simplified diagrammatic representation of a portion of a disk surface illustrating various track modes in a disk drive; and, FIG. 7 is a flowchart illustrating a technique for compensating for non-linearities due to pivot bearing friction when determining embedded runout correction values during partial self-servo write of a disk drive, in accordance with an embodiment of the present invention.

FIG. 6 illustrates eight possible tracks modes, which are used in position a reader (or read head) relative to a disk surface, as will be understood by those skilled in the art. When partial self-servo writing, the WRO due to burst propagation while partial self-servo writing is given by the following following general formula:

$$wro_{13}pssw(f,k+1)=wro(k)*g(f)$$

where wro(k) is the written-in runout at track k and g(f) is the peaking of the closed loop transfer function at frequency f.

The amount of error propagation is dependent upon the particular track mode used to position the reader relative to the disk surface. In track modes 0/4, the A and B bursts are used to write C and D bursts. Since the A and B bursts were written by the servo track writer, the WRO of track n (WROn) is only equal to the amount of WRO associated with A/B bursts (i.e., the STW_RRO) at track n−1 plus the NRRO (non-repeatable runout) at the time of writing the C and D bursts. Accordingly, for track modes 0/4, the written-in repeatable runout after partial self-servo writing can be represented by the following equation:

$$wro\_pssw(f,k+1)=(wro\_stw(f,k)+nrro(f,k)+nrro(f,k)*g(f)$$

where wro_pssw is the written-in repetitive runout due to burst propagation when partial self-servo writing, wro_stw is the written-in repetitive runout due to burst writing by the servo track writer, nwro is non-written-in synchronized repeatable runout, nrro is non-repeatable runout and g(f) is the peaking of the closed loop transfer function at frequency f.

In track modes 1/3/5/7, the A, B, C and D bursts are used to write the C and D bursts during propagation. Roughly, half of the error attributable to partial self-servo writing and half the error due to servo track writing is accumulated, which can be represented by the following equation:

$$wro\_pssw(f,k+1)=(wro\_pssw(f,k)/2+wro\_stw(f,k)/2+nwro(f,k)*g(f)$$

In track modes 2/6, the C and D bursts are used to write the C and D burst during propagation. Accordingly, the error is accumulated aggressively and can be represented by the following equation:

$$wro\_pssw(f,k+1)=(wro\_pssw(f,k)+nwro(f,k)+nrro(f,k))*g(f)$$

The present invention uses a feedback control scheme to contain the WRO error during propagation (i.e., writing of additional tracks). The compensation for the pivot bearing friction is calculated based on WRO at individual harmonic frequencies. It is then summed with the PES (position error signal) to achieve the attenuation of WRO. The goal of the compensation system is to achieve system stability and fast convergence of WRO error.

Figure 7:
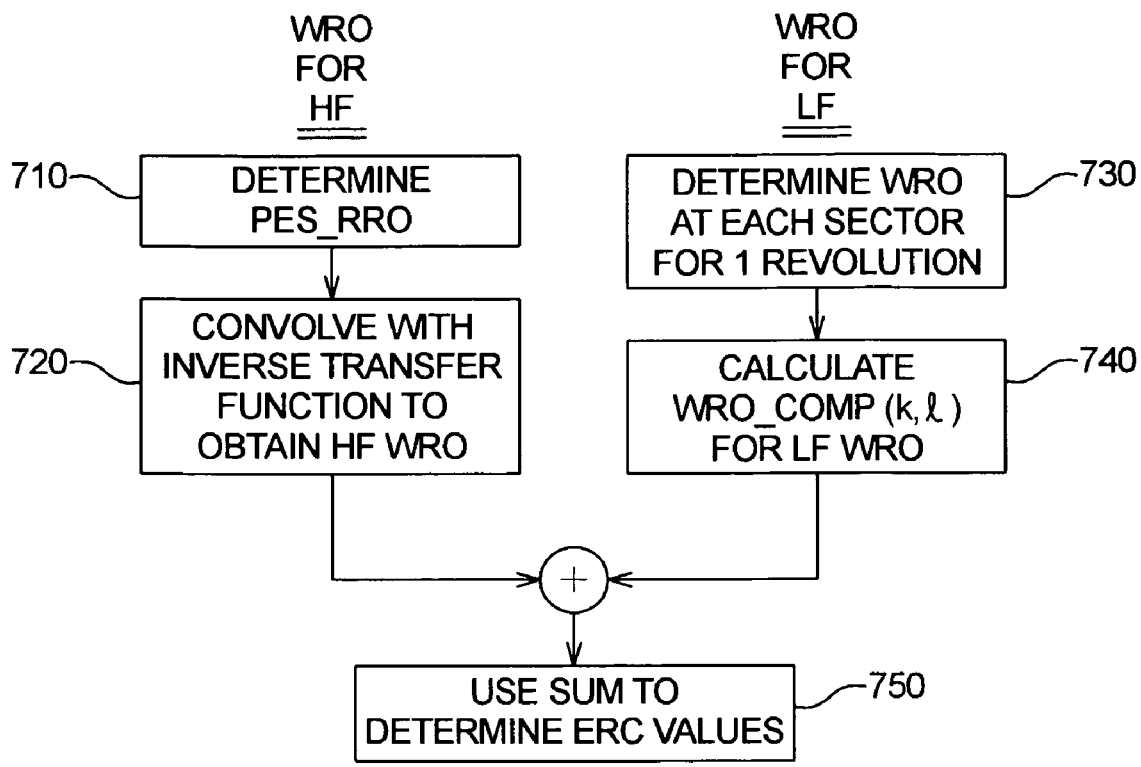

Reference is now made to FIG. 7, which illustrates an embodiment of the present invention that is used during the process of partial self-servo writing. After the read head is positioned on the track which it will follow in order to position the write head for writing additional C and D servo bursts, a determination is made of the PES_RRO (step 710) by measuring the position error signal (PES) while track following and averaging the PES values (on a sector-by-sector basis) for a predetermined number (e.g., 8) of revolutions.

After the PES_RRO has been obtained, it is convolved with the inverse error transfer function to determine the high-frequency written-in runout (step 720).

In order to determine the written-in runout at low frequencies, the WRO (offset between the intersections of the A/B bursts and C/D bursts) at each sector is measured for one revolution of the disk surface using the table below (step 730).

| Track Mode | 1 | 3 | 5 | 7 |
|---|---|---|---|---|
| PES | (A − B) − (C − D) | (A − B) + (C − D) | −(A − B) + (C − D) | −(A − B) − (C − D) |
| WRO | (A − B) + (C − D) | −(A − B) + (C − D) | −(A − B) − (C − D) | (A − B) − (C − D) |

Since the WRO can only be measured in the ⅕ mode or the ⅜ mode, the closest ⅕ mode and ⅜ mode on both sides of the read location are determined and the reader fractionally seeks to the location in order to measure the WRO. In one embodiment, two measurements of WRO are made. A first measurement (WRO$_1$) is made using the C/D bursts of a first servo wedge and the A/B bursts of the first servo wedge. A second measurement (WRO$_2$) is made using the C/D bursts of the first servo wedge and A/B bursts of a second servo wedge. These two values are averaged to obtain the WRO used for the compensation (WRO=(WRO$_1$+WRO$_2$)/2)). This serves to improve the signal-to-noise ratio, as both sets of measurements contain the desired WRO and some uncorrelated errors.

As an example, reference is made to FIG. 6. When the reader is located on track mode 2, WRO$_1$ is measured by positioning the reader to the closest track mode 1 while WRO$_2$ is measured by positioning the reader to the closest track mode 3.

Returning to FIG. 7, in step 740, the WRO compensation values are calculated. Specifically, a discrete Fourier transform is used to retrieve the amplitude and phase of desired harmonic frequencies. The discrete Fourier transform can be represented by a sine and a cosine term. The compensation values are calculated to ensure system stability and performance for the desired harmonic frequency. Compensation values for each desired harmonic frequency are calculated for each sector and summed together as feedback to PES.

The equations to extract the WRO component for the n$^{th}$ harmonic frequency are as follows:

$$\sin nf(l) = \frac{2}{N} \sum_{k=0}^{N-1} \sin(2*\pi*k*l/N)*wro(k)$$

$$\cos nf(l) = \frac{2}{N} \sum_{k=0}^{N-1} \cos(2*\pi*k*l/N)*wro(k)$$

where l is the harmonic, N is the total number of servo sectors for a track, k is a particular servo sector for the track, nf is a note and wro(k) is a measured value using the table below.

A PI (proportional integrator) compensation is then calculated as follows:

$\sin nf\_int(l) = \sin nf\_int(l-1) + \sin nf(l)$ $\cos nf\_int(l) = \cos nf\_int(l-1) + \cos nf(l)$ $\sin nf\_comp(l) = k_p*\sin nf(l) + k_i*\sin nf\_int(l)$ $\cos nf\_comp(l) = k_p*\cos nf(l) + k_i*\cos nf\_int(l)$ Using the above equations, the compensation for each individual sector k is calculated as follows:

$wro\_comp(k,l) = -\sin nf\_comp(l)*\sin(2*\pi*k*l/N) - \cos nf\_comp(l)*\cos(2*\pi*k*l/N)$ $k_p$ and $k_i$ are proportional gain and integral gain for a typical PI controller, respectively. Integration control is applied to compensate for the correlated WRO written by the servo track writer. $k_i$ is not zero only in 1/3/5/7 track mode when both A/B (written by the STW) and C/D (written by partial self-servo writing) are used to decode the PES.

The high frequency written-in runout and low-frequency written-in runout are combined and used to determine embedded runout correction (ERC) values for the track (step 750). The ERC values are used to position the reader relative to the track in an effort to reduce propagation errors when writing subsequent tracks during partial self-servo write.

The present invention may be implemented in the firmware of the controller or any other convenient place in the disk drive. In addition, the present invention may be implemented in a computer external to the disk drive.

While an effort has been made to describe some alternatives to the preferred embodiment, other alternatives will readily come to mind to those skilled in the art. Therefore, it should be understood that the invention may be embodied in other specific forms without departing from the spirit or central characteristics thereof. The present examples and embodiments, therefore, are to be considered in all respects as illustrative and not restrictive, and the invention is not intended to be limited to the details given herein.

What is claimed is:

1. A method comprising the steps of:
   providing a disk surface having a track written thereon, wherein the track has some written-in runout;
   determining written-in runout for the track that is associated with high frequencies using a first technique; and,
   determining written-in runout for the track that is associated with low frequencies using a second technique, wherein a first distance between an intersection between A and B bursts for a first servo sector of the track and an intersection between C and D bursts for the first servo sector of the track is used in determining the written-in runout for the track that is associated with low frequencies.

2. The method of claim 1, wherein a proportional integrator controller is used in connection with determining the written-in runout for the track that is associated with low frequencies.

3. The method of claim 1, wherein a second distance between an intersection between A and B bursts for a second servo sector of the track and an intersection between C and D bursts for the first servo sector of the track is used in determining the written-in runout for the track that is associated with low frequencies.

4. The method of claim 3, wherein an average of the first distance and the second distance is used in determining the written-in runout for the track that is associated with low frequencies.

5. The method of claim 1, further comprising the step of:
   writing servo information onto the disk surface using both the determined written-in runout for the track that is associated with high frequencies and the determined written-in runout for the track that is associated with low frequencies.

6. The method of claim 5, wherein the servo information is written without a servo track writer.

7. The method of claim 1, wherein prior to determining the written-in runout for the track that is associated with high frequencies, a servo track writer is used to write servo information onto the disk surface.

8. The method of claim 7, wherein after determining the written-in runout for the track that is associated with high frequencies, servo information is written onto the disk surface without a servo track writer.

9. The method of claim 1, wherein a servo track writer is used to write A and B bursts onto the disk surface.

10. The method of claim 9, wherein a C burst is written without a servo track writer.

11. The method of claim 10, wherein the C burst is self-servo written onto the disk surface.

12. The method of claim 11, wherein a D burst is written without servo track writer.

13. The method of claim 12, wherein the D burst is self-servo written onto the disk surface.

14. The method of claim 1, wherein the written-in runout for the track that is associated with high frequencies and the written-in runout for the track that is associated with low frequencies are combined to determine embedded runout correction values for the track.

15. The method of claim 14, wherein the embedded runout correction values are used in writing servo information onto the disk surface.

16. A method comprising the steps of:
providing a disk surface having a track written thereon, wherein the track has some written-in runout;
determining written-in runout for the track that is associated with high frequencies using a first technique;
determining written-in runout for the track that is associated with low frequencies using a second technique;
writing servo information onto the disk surface using both the determined written- in runout for the track that is associated with high frequencies and the determined written-in runout for the track that is associated with low frequencies.

17. The method of claim 16, wherein the servo information is written without a servo track writer.

18. The method of claim 16, wherein prior to determining the written-in runout for the track that is associated with high frequencies, a servo track writer is used to write servo information onto the disk surface.

19. The method of claim 18, wherein after determining the written-in runout for the track that is associated with high frequencies, servo information is written onto the disk surface without a servo track writer.

20. The method of claim 18, wherein the servo track writer is used to write A and B bursts onto the disk surface.

21. The method of claim 20, wherein C bursts are written without a servo track writer.

22. The method of claim 21, wherein C bursts are self-servo written onto the disk surface.

23. The method of claim 22, wherein D bursts are written without a servo track writer.

24. The method of claim 23, wherein D bursts are self-servo written onto the disk surface.

25. The method of claim 16, wherein the written-in runout for the track that is associated with high frequencies and the written-in runout for the track that is associated with low frequencies are combined to determine embedded runout correction values for the track.

26. An apparatus comprising:
a disk surface having a track written thereon, wherein the track has some written- in runout;
circuitry for determining written-in runout for the track that is associated with high frequencies using a first technique; and,
circuitry for determining written-in runout for the track that is associated with low frequencies using a second technique, wherein a first distance between an intersection between A and B bursts for a first servo sector of the track and an intersection between C and D bursts for the first servo sector of the track is used in determining the written-in runout for the track that is associated with low frequencies.

27. The apparatus of claim 26, further including a proportional integrator controller used to determine the written-in runout for the track that is associated with low frequencies.

28. The apparatus of claim 26, wherein a second distance between an intersection between A and B bursts for a second servo sector of the track and an intersection between C and D bursts for the first servo sector of the track is used in determining the written-in runout for the track that is associated with low frequencies.

29. The apparatus of claim 28, wherein an average of the first distance and the second distance is used in determining the written-in runout for the track that is associated with low frequencies.

30. The apparatus of claim 26, further including a write head associated with the disk surface for writing servo information onto the disk surface using both the determined written-in runout for the track that is associated with high frequencies and the determined written-in runout for the track that is associated with low frequencies.

31. The apparatus of claim 30, wherein the servo information is written without a servo track writer.

32. The apparatus of claim 26, further including a write head associated with the disk surface, wherein prior to determining the written-in runout for the track that is associated with high frequencies, a servo track writer is used in conjunction with the write head to write servo information onto the disk surface.

33. The apparatus claim 32, wherein after determining the written-in runout for the track that is associated with high frequencies, servo information is written onto the disk surface by the write head without the servo track writer.

34. The apparatus of claim 26, wherein the written-in runout for the track that is associated with high frequencies and the written-in runout for the track that is associated with low frequencies are combined to determine embedded runout correction values for the track.

35. The apparatus of claim 34, wherein the embedded runout correction values are used to write servo information onto the disk surface.

36. An apparatus comprising:
a disk surface having a track written thereon, wherein the track has some written- in runout;
circuitry for determining written-in runout for the track that is associated with high frequencies using a first technique;
circuitry for determining written-in runout for the track that is associated with low frequencies using a second technique;
a write head associated with the disk surface for writing servo information onto the disk surface using both the determined written-in runout for the track that is associated with high frequencies and the determined written-in runout for the track that is associated with low frequencies.

37. The apparatus of claim 36, wherein the servo information is written without a servo track writer.

38. The apparatus of claim 36, wherein prior to determining the written-in runout for the track that is associated with high frequencies, a servo track writer is used to write servo information onto the disk surface.

39. The apparatus of claim 38, wherein after determining the written-in runout for the track that is associated with high frequencies, servo information is written without a servo track writer.

40. The apparatus of claim 38, wherein the servo track writer is used to write A and B bursts onto the disk surface.

41. The apparatus of claim 40, wherein C bursts are written without a servo track writer.

42. The apparatus of claim 41, wherein C bursts are self-servo written onto the disk surface using the write head.

43. The apparatus of claim 42, wherein D bursts are written without a servo track writer.

44. The apparatus of claim 43, wherein D bursts are self-servo written onto the disk surface using the write head.

45. The apparatus of claim 36, wherein the written-in runout for the track that is associated with high frequencies and the written-in runout for the track that is associated with low frequencies are combined to determine embedded runout correction values for the track.

* * * * *